United States Patent Office 2,787,061
Patented Apr. 2, 1957

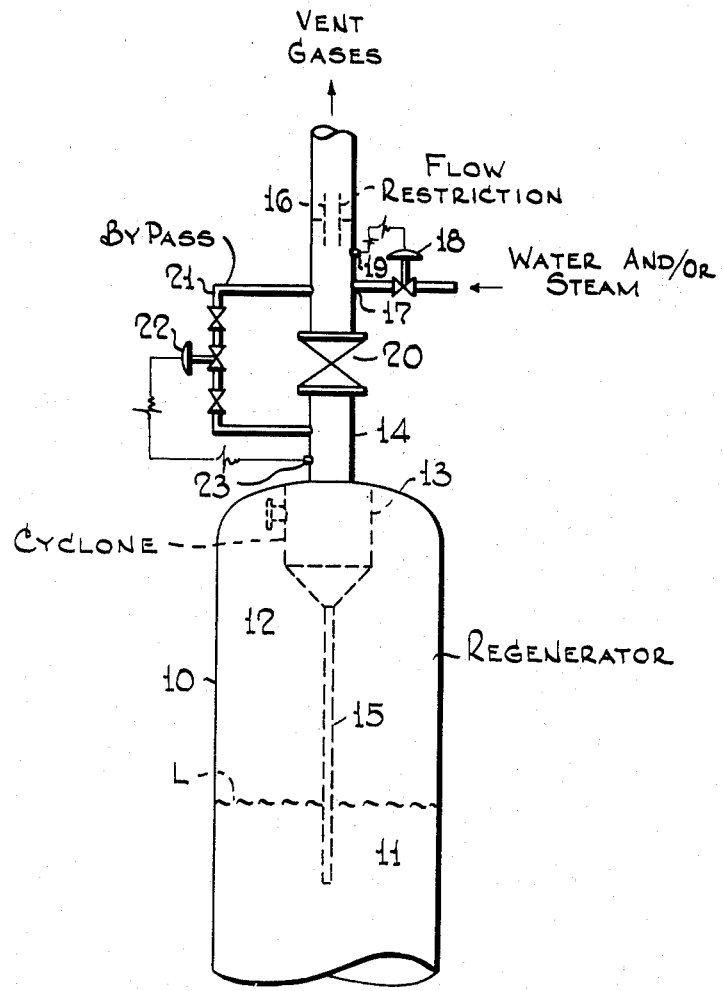

2,787,061

PRESSURE CONTROL FOR FLUIDIZED SOLIDS OPERATIONS

Edward W. S. Nicholson and Lloyd A. Nicolai, Baton Rouge, La., assignors to Esso Research and Engineering Company, a corporation of Delaware Application December 26, 1951, Serial No. 263,446

2 Claims. (Cl. 34—57)

The present invention pertains to pressure controls and particularly to pressure controls for use in fluidized solids operations.

In fluid solids operations, especially those carried out at relatively high pressures such as fluid hydroforming and the adsorption of light hydrocarbons, the maintenance of pressure on the system has been a serious problem. The use of pressure control valves on the solids-laden streams directly at the outlet of the vessel has resulted in very rapid erosion of the control valves. Locating the control valves further downstream in the system following scrubbing equipment for the removal of solids has not proven satisfactory because the extra surge volume included before the point of pressure control results in poor sensitivity of response and also surging pressures in the system.

It is the object of this invention to provide a novel pressure control.

It is also the object of this invention to provide a novel pressure control that may be used to effectively control solids-laden streams in high pressure fluidized solids operations.

It is a further object of this invention to provide a pressure control for high pressure fluidized solids operations that is not subject to rapid erosion which will provide good sensitivity of response and will maintain pressure without appreciable surges in the system.

These and other objects will appear more clearly from the detailed specification and claims which follow.

It has now been found that the problems of maintaining pressure control in fluidized solids operations carried out at relatively high pressures are successfully overcome by providing a fixed flow restriction in the outlet line from the vessel in which pressure is to be controlled and controlling the pressure by introducing water, if the exit gas stream is sufficiently hot to vaporize the water, or steam or some other process gas stream upstream from the fixed restriction. The rate of introduction of the water or gas is regulated automatically by a valve controlled by a pressure controller which is actuated by the pressure at the location where pressure control is desired. Thus positive, automatic pressure control is obtained directly at the vessel outlet on a stream of gas or vapors containing entrained solids without employing any moving parts, hot suffing boxes or other equipment which is difficult to maintain, and with no problems of erosion.

Reference is made to the accompanying drawing illustrating a cross section through a pressure control in accordance with the present invention.

In the drawing, 10 is a vessel for carrying out a chemical reaction or adsorption at superatmospheric pressure in accordance with the fluidized solids technique. 11 is a dense fluidized bed of finely divided solid particles in gaseous or vaporous materials having a definite level L or interface separating the dense bed 11 from a dilute or disperse phase 12 comprising small amounts of the solid contact particles entrained in the gaseous or vaporous products. In order to reduce the amount of solid contact material carried away by the outgoing stream the latter is passed through a cyclone separator 13, or the like and thence into outlet line 14. The solid particles separated in the cyclone are returned to the dense bed 11 through dip pipe 15.

In order to maintain the contents of vessel 10 under superatmospheric pressure, the outgoing stream in outlet line 14 containing a small residual amount of contact material must be passed through a pressure controller. In accordance with the present invention pressure control is maintained by providing a flow restriction or orifice 16 within the outlet line and injecting steam, process gas, water or other vaporizable fluid at 17, upstream from the restriction 16. The rate of introduction of the water or gas is regulated automatically by valve 18 controlled by a pressure controller actuated by the pressure in the outlet line adjacent the inlet of the flow restriction or orifice so that the flow is increased when the pressure at 19 drops and the flow is decreased when the pressure at 19 rises.

In order to start up the equipment at lower than normal gas rates, a shut off cock or simple slide valve 20 may be included in the main outlet line 14 with a smaller by-pass line 21 around it. An ordinary pressure control valve 22, actuated by the pressure at 23 is provided in the by-pass line, but since this by-pass would be used for only a very short period in each run, maintenance of this control valve would be of negligible importance.

Automatic pressure control of this type would be particularly useful in numerous high pressure fluidized solids operations. Examples are fluid hydroforming, particularly on the regenerator side where it is necessary to vent off regeneration gases containing small amounts of entrained catalyst, and in the adsorption of light hydrocarbons on activated carbon, or the like.

The foregoing description contains a limited number of embodiments of the present invention. It will be understood that numerous variations are possible without departing from the spirit of this invention.

What is claimed is:

1. An apparatus for contacting vapors and gases with finely divided solid contact agents at elevated pressures comprising a vessel, an outlet line for the withdrawal of vaporous materials from said vessel attached to the top thereof, means for separating entrained solid particles from the vaporous materials entering said outlet line, means for returning the separated solids to the interior of the vessel, a fixed flow restriction arranged in said outlet line, an inlet line for the introduction of a gas or vaporizable fluid into the outlet line adjacent to the inlet side of said fixed flow restriction and a valve in said inlet line operated by a pressure controller which is actuated by the pressure in the outlet line to increase the flow of fluid through said inlet line when the pressure decreases and to decrease the flow of fluid through said inlet line when the pressure increases.

2. An apparatus for contacting vapors and gases with finely divided solid contact agents at elevated pressures comprising a vessel, an outlet line for the withdrawal of vaporous materials from said vessel attached to the top thereof, means for separating entrained solid particles from the vaporous materials entering said outlet line, means for returning the separated solids to the interior of the vessel, a fixed flow restriction arranged in said outlet line, an inlet line for the introduction of a gas or vaporizable fluid into the outlet line adjacent to the inlet side of said fixed flow restriction, a valve in said inlet line operated by a pressure controller which is actuated by the pressure in the outlet line to increase the flow of fluid through said inlet line when the pressure decreases and to decrease the flow of fluid through said inlet line when the pressure increases, a shut-off valve in said outlet line between the vessel and said fixed flow restriction, a by-pass conduit arranged with its inlet end connected to said outlet line between the vessel and the shut-off valve and its outlet end connected to said outlet line between the shut-off valve and said fixed flow restriction and a pressure control valve arranged in said by-pass conduit.

References Cited in the file of this patent

UNITED STATES PATENTS

| | | |
|---|---|---|
| 1,783,163 | Griswold | Nov. 25, 1930 |
| 1,889,800 | Davis | Dec. 6, 1932 |
| 1,908,357 | Hornbruch | May 9, 1933 |
| 2,360,900 | Setterwall | Oct. 24, 1944 |
| 2,464,812 | Johnson | Mar. 22, 1949 |
| 2,476,104 | Mason | July 12, 1949 |
| 2,554,772 | Bereman | May 29, 1951 |
| 2,640,731 | Hill | June 2, 1953 |